July 24, 1951 — L. S. SAYRE — 2,561,823

FAUCET

Filed Sept. 21, 1946

INVENTOR
LOUIS S. SAYRE
BY Mason & Graham
ATTORNEYS

Patented July 24, 1951

2,561,823

UNITED STATES PATENT OFFICE 2,561,823

FAUCET

Louis S. Sayre, Los Angeles, Calif.

Application September 21, 1946, Serial No. 698,526

1 Claim. (Cl. 251—156)

This invention has to do with faucets and has among its objects the provision of a faucet which is capable of unusually long life without renewal of parts; which provides maximum flow at any given pressure; which is extremely easy to operate, being capable of being opened and closed by touch pressure; which is unusually easy to repair; which may be made with maximum economy; and which is highly compact and presents but a minimum of protuberances.

While my invention is susceptible of being embodied in various specific physical forms, for the purpose of making the invention understood I shall now describe one presently preferred embodiment by which I accomplish the above-named objects as well as further objects and advantages which will become obvious from the ensuing description, for which purpose I shall refer to the accompanying drawings, wherein.

Figure 1:
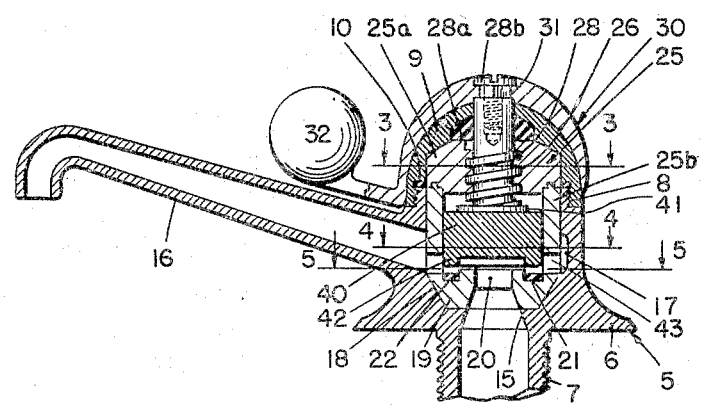
Fig. 1 is a medial vertical section with some parts being shown in side elevation.
Figure 2:
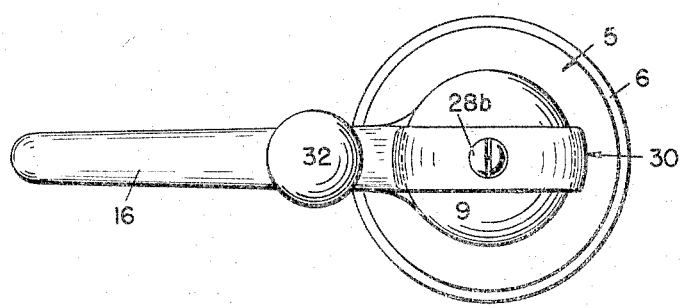
Fig. 2 is a top plan view.
Figure 3:
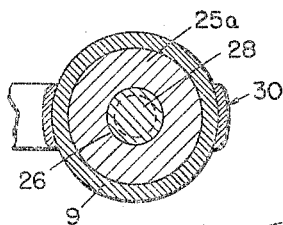
Figs. 3, 4 and 5 are cross-sectional views taken on the lines 3—3, 4—4, 5—5, respectively, of Fig. 1.
Figure 4:
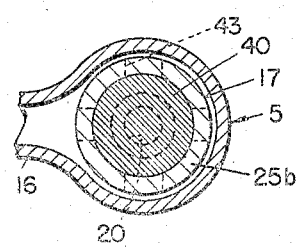
Figure 5:
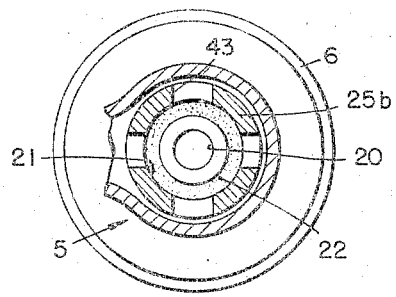

Referring now to the drawings, the numeral 5 generally denotes the body of the faucet, which is preferably round in cross-section, presenting a bottom annular flange 6 for engaging the surface of a basin or the like on which the faucet is mounted, an exteriorly threaded inlet neck 7 and a reduced diameter externally threaded top portion 8 to threadedly receive a semi-spherical cap 9, a packing washer 10 being interposed between the body and cap. The body has a tapered inlet opening 15 which communicates with a spout 16 through an annular chamber 17.

The chamber 17 has a conical bottom 18 against which rests a conforming ring 19 having an orifice 20 and an annular upwardly opening recess 21 within which rests a sealing washer 22.

A core member or plunger guide generally denoted 25 is stationarily held in the body by the cap 9, the member 25 consisting of an upper portion 25a and a lower sleeve-like portion 25b, which portions are fitted together by annular tongue and groove means.

The upper portion 25a of the core member has a threaded bore 26 to threadedly receive the threaded stem 28, there being a stem washer 28a around the stem and interposed between the cap 9 and portion 25a. An arched operating handle 30 conforming in longitudinal section to the outer surface of the cap, has a squared opening 31 to receive the squared end portion of stem 28, the handle being secured against escape from the stem by a screw 28b whose head is countersunk in the cap. The handle 30 has a knob 32 which closely overhangs the spout.

A plunger 40 floats between the enlarged end 41 of the stem and said washer 22, being forced axially downwardly within the sleeve 25a, which acts as a guide, and against the washer 22, when the stem is screwed inwardly. When the stem is screwed outwardly, the plunger is forced upwardly and out of sealing engagement with the washer 22 in response to the fluid under pressure entering the inlet. The plunger has on its lower end an annular projection 42 which is of a size and shape to be capable of entering the recess 21 to compress the sealing washer 22 therein and provide a seal.

Thus when the plunger is off its seat, fluid entering under pressure through orifice 20 passes into chamber 17 through radial ports 43 provided in the lower end of the sleeve 25a and thence the fluid passes out through the spout. On the other hand, when the plunger is seated against the washer 22, the chamber 17 and the spout are closed from communication with the inlet.

While I do not limit my invention to the use of any particular material, I preferably make all the parts except the sealing washers or gaskets of brass or stainless steel.

In the drawings the faucet is shown slightly open in Fig. 1, or with the plunger slightly out of engagement with the sealing washer, so that fluid may pass from the orifice into chamber 17 and thence outwardly through the spout, the fluid pressure forcing the plunger upwardly when the stem is screwed outwardly. Since the cooperating seat members do not rotate to open and close the faucet, operation of the stem is so easy as to be capable of being rotated by touch pressure applied to the knob. To close the faucet the handle is swung in the opposite direction to screw the stem inwardly and thus cause its enlarged end to engage and force the plunger downwardly onto the seat. The semi-spherical shape of the cap and the arched disposition of the handle eliminates any objectionable protuberances and sharp corners such as are present in conventional faucets. There is a minimum of wear on the parts and the entire inner assembly may be removed from the device by simply unscrewing the cap and removing the parts axially from the body.

I claim:

A faucet comprising a body having an axial inlet and a radial outlet, and an axial bore having a tapered bottom end portion intersecting the inlet, the bore having an enlarged portion providing an outlet chamber communicating with the outlet, an annular seat member axially removably fitting in the bore, the seat member having a tapered exterior surface fitting in the tapered portion of the bore, a sleeve-like upper extension providing a valve cage and an annular recess opening upwardly into the cage to receive a seal washer, the cage having a radial port communicating with the outlet chamber, a valve mounted to float in the cage, the valve having a depending annular bottom end portion engageable in said annular recess, a cap detachably secured on the body covering the upper end of the bore, the cap engaging the upper end of the cage, and a valve actuating stem threadedly mounted in the cap, said seat member and valve being removable from the body as a unit when the cap is removed.

LOUIS S. SAYRE.

REFERENCES CITED

The following references are of record in the file of this patent:

UNITED STATES PATENTS

| Number | Name | Date |
| --- | --- | --- |
| 283,660 | Reed | Aug. 21, 1883 |
| 675,426 | Sultner | June 4, 1901 |
| 816,245 | McElroy | Mar. 27, 1906 |
| 1,642,724 | Fleming | Sept. 20, 1927 |
| 1,667,580 | Albrecht | Apr. 24, 1928 |
| 1,703,861 | Bohnhardt | Mar. 5, 1929 |
| 1,758,708 | Ledon | May 13, 1930 |
| 1,875,574 | Duncan | Sept. 6, 1932 |
| 1,886,058 | Shoemaker | Nov. 1, 1932 |
| 2,188,850 | Zinkil | Feb. 26, 1937 |
| 2,253,372 | Fischer | Aug. 19, 1941 |

FOREIGN PATENTS

| Number | Country | Date |
| --- | --- | --- |
| 280,303 | Italy | Dec. 4, 1930 |